United States Patent
Hoffmann et al.

(10) Patent No.: US 11,479,633 B2
(45) Date of Patent: Oct. 25, 2022

(54) COATING MATERIAL, SYSTEM BASED ON LI/BI CATALYSTS

(71) Applicant: Akzo Nobel Coatings International B.V., Amsterdam (NL)

(72) Inventors: Peter Hoffmann, Senden (DE); Benedikt Schnier, Warendorf (DE)

(73) Assignee: Akzo Nobel Coatings International B.V., Amsterdam (NL)

( * ) Notice: Subject to any disclaimer, the term of this patent is extended or adjusted under 35 U.S.C. 154(b) by 700 days.

(21) Appl. No.: 15/545,561

(22) PCT Filed: Jan. 22, 2016

(86) PCT No.: PCT/EP2016/051318
§ 371 (c)(1),
(2) Date: Jul. 21, 2017

(87) PCT Pub. No.: WO2016/120160
PCT Pub. Date: Aug. 4, 2016

(65) Prior Publication Data
US 2018/0016381 A1   Jan. 18, 2018

(30) Foreign Application Priority Data
Jan. 22, 2015   (EP) .................................... 15152119

(51) Int. Cl.
| | | |
|---|---|---|
| C08G 18/00 | (2006.01) | |
| C08G 18/38 | (2006.01) | |
| C08G 18/22 | (2006.01) | |
| C09D 175/04 | (2006.01) | |
| C08G 18/62 | (2006.01) | |
| C08G 18/79 | (2006.01) | |
| B01J 23/18 | (2006.01) | |
| C09D 7/63 | (2018.01) | |
| C09D 7/41 | (2018.01) | |
| C08G 18/32 | (2006.01) | |

(52) U.S. Cl.
CPC .......... *C08G 18/3831* (2013.01); *B01J 23/18* (2013.01); *C08G 18/225* (2013.01); *C08G 18/227* (2013.01); *C08G 18/3203* (2013.01); *C08G 18/6254* (2013.01); *C08G 18/792* (2013.01); *C09D 7/41* (2018.01); *C09D 7/63* (2018.01); *C09D 175/04* (2013.01)

(58) Field of Classification Search
CPC ............ C08G 18/3831; C08G 18/3203; C08G 18/225; C08G 18/6254; C08G 18/792; C08G 18/227; B01J 23/18; C09D 7/41; C09D 7/63; C09D 175/04
See application file for complete search history.

(56) References Cited

U.S. PATENT DOCUMENTS

| | | | |
|---|---|---|---|
| 4,256,847 A | 3/1981 | Spector | |
| 4,598,131 A | 7/1986 | Prucnal | |
| 4,853,146 A | 8/1989 | Rörig et al. | |
| 4,939,213 A | 7/1990 | Jacobs, III et al. | |
| 5,011,902 A | 4/1991 | Foucht | |
| 5,084,541 A | 1/1992 | Jacobs, III et al. | |
| 5,324,754 A | 6/1994 | Valoppi et al. | |
| 5,705,641 A | 1/1998 | Flood et al. | |
| 5,716,678 A | 2/1998 | Röckrath et al. | |
| 6,046,270 A | 4/2000 | Roesler et al. | |
| 6,403,699 B1 | 6/2002 | Röckrath et al. | |
| 6,590,057 B1* | 7/2003 | Brecht ................. | C08G 18/225 528/57 |
| 8,569,438 B2* | 10/2013 | Groenewolt ......... | C08G 18/289 528/21 |
| 2003/0027921 A1 | 2/2003 | Speier et al. | |
| 2003/0207985 A1 | 11/2003 | Anderson et al. | |
| 2005/0182189 A1 | 8/2005 | Ohrbom et al. | |
| 2006/0036007 A1* | 2/2006 | Hsieh ................... | C08G 18/798 524/104 |
| 2006/0293486 A1* | 12/2006 | Emmrich ............. | C08G 18/485 528/44 |
| 2011/0184119 A1 | 7/2011 | Bloess et al. | |
| 2011/0245406 A1* | 10/2011 | Klein ................... | C08G 18/809 524/538 |

(Continued)

FOREIGN PATENT DOCUMENTS

| | | |
|---|---|---|
| DE | 10 2010 005 868 A1 | 7/2011 |
| EP | 0 008 127 A1 | 2/1980 |
| EP | 0 249 201 A2 | 12/1987 |

(Continued)

OTHER PUBLICATIONS

International Search Report dated Jul. 8, 2016 in PCT/EP2016/051318.
Werner J. Blank, et al., "Catalysis of the Isocyanate-Hydroxyl Reaction by Non-Tin Catalysts" King Industries Inc., Aug. 1, 1999, 15 Pages.
"Replacing a Veritable Workhorse" European Coatings Journal, Vincentz Network, issue: Jul. 8, 2008, 11 pages.
Ulrich Meier-Westhues: Polyurethane. Lacke, Kleb- and Dichtstoffe. Vincentz-Verlag, ISBN: 9783866308961, Apr. 2007.

(Continued)

*Primary Examiner* — Hai Y Zhang
(74) *Attorney, Agent, or Firm* — Pauly, DeVries Smith & Deffner LLC

(57) ABSTRACT

Disclosed herein is a coating material system containing (A) at least one polyhydroxy group-containing compound, (B) at least one polyisocyanate-containing compound, and (C) at least one catalyst comprising lithium (Li) and bismuth (Bi) as metal components and where the molar ratio of lithium to bismuth is at least 7:1 [mol/mol], in which i) components (A), (B), and (C) are present separately from one another, or ii) are mixed wholly or at least partly with one another. Methods for producing and using the coating material system are also disclosed herein.

33 Claims, No Drawings

(56) References Cited

U.S. PATENT DOCUMENTS

| | | |
|---|---|---|
| 2014/0200305 A1 | 7/2014 | Iwata et al. |
| 2014/0322448 A1 | 10/2014 | Hoffmann et al. |

FOREIGN PATENT DOCUMENTS

| | | |
|---|---|---|
| EP | 0 276 501 A2 | 8/1988 |
| EP | 0 624 577 A1 | 11/1994 |
| EP | 0 692 007 A1 | 1/1996 |
| EP | 0 994 117 A1 | 4/2000 |
| EP | 1 273 640 A2 | 1/2003 |
| EP | 2 762 541 A1 | 8/2014 |
| JP | 6-322062 A | 11/1994 |
| JP | 2007-2247 A | 1/2007 |
| KR | 2002-0040887 A | 5/2002 |
| KR | 10-2006-0134822 A | 12/2006 |
| WO | WO 94/22968 A1 | 10/1994 |
| WO | WO 97/12945 A1 | 4/1997 |
| WO | WO 01/09260 A1 | 2/2001 |
| WO | WO 01/29108 A1 | 4/2001 |
| WO | WO 2012/123198 A1 | 9/2012 |

OTHER PUBLICATIONS

Ulrich Zorll, et al., "Lacke and Druckfarben" Römpp Lexikon, Georg Thieme Verlag, 1998, pp. 250 to 252 and cover page.

Thomas Brock, et al., European Coatings Handbook, Vincentz Verlag, ISBN 3-86630-849-3.

Korean Office Action dated Oct. 29, 2018 in Korean Patent Application No. 10-2017-7020143 (submitting English translation only), 4 pages.

Office Action dated Aug. 21, 2018 in Japanese Patent Application No. 2017-538958, 2 pages (submitting English language translation only).

* cited by examiner

COATING MATERIAL, SYSTEM BASED ON LI/BI CATALYSTS

The invention relates to a coating material system which comprises components (A) to (C) and also, optionally, further components, with, in a first option, all components (A) to (C) and also, where present, the further optional components being present separately from one another, in other words the individual components not being mixed with one another. In a second option of the coating material system of the invention, conversely, the aforementioned components may also be mixed wholly or at least partly with one another. Where the components are at least partly mixed with one another, this means that, for example, component (C) is mixed with component (A), while component (B) is present separately from this mixture of (A) and (C). Optionally, however, component (B) may also be mixed with a portion of component (C). Furthermore, the mixtures of (A) and (C) and of (B) and (C) may additionally comprise at least one optional component such as a solvent, for example.

Component (A) comprises at least one polyhydroxy group-containing compound and component (B) comprises at least one polyisocyanate-containing compound. Component (C), by contrast, is a catalyst comprising lithium and bismuth in a molar ratio of at least 7:1 as metal components. Further components which may be present in the coating material system of the invention include, for example, hydroxyl-containing compounds (B), coating additives (F), pigments (H) and/or solvents (J).

A further subject of the present invention, then, is also a method for producing polyurethanes which are obtained by curing of the coating material system described above. "Curing" (cure) in the sense of the present invention means that the components (A) and (B) present in the coating material system of the invention react with one another in the presence of the catalyst of component (C) to form a polyurethane. The reaction, i.e., the curing, may proceed at least partially, but preferably there is complete curing, meaning that the components (A) and (B) present in the coating material system of the invention undergo complete or near-complete reaction with one another.

Further subjects of the present invention, accordingly, are also methods for producing the coating material system of the invention. Moreover, the use of the coating material system of the invention, or of the polyurethane which has been produced from the coating material system of the invention, as, for example, a coating material, more particularly as a clearcoat or as a pigmented paint, is a subject of the present invention.

A further subject of the present invention is a method for producing a coating using the coating material system of the invention, and also the coating as such.

A further subject of the present invention is the use of the catalyst of component (C) of the coating material system according to the invention, for the production, for example, of polyurethanes or for the production of a paint. Furthermore, the catalyst as such that is used in the coating material system of the invention is a further subject of the present invention.

The preparation of polyurethanes by reaction of a compound having at least two hydroxyl groups per molecule with a compound having at least two isocyanate groups per molecule already has a long history. Depending on the reactivity of the compounds in question, it is entirely possible for spontaneous and/or partial curing (reaction of the two reactant components) to take place purely by simple mixing of the respective reactant components. For technical reasons, however, spontaneous reaction is to be suppressed, in order to ensure safe operation. In order to allow the reaction to then proceed with sufficient rapidity, however, after mixing and after a certain latency time, recourse is had to what are called catalysts.

Specific preparation of the polyurethane, however, takes place generally in the presence of an appropriate catalyst. In view of the reactivity of the two reactant components of the polyurethane, it is very widespread practice for the reactant components in question to be provided separately from one another, with the catalyst optionally having been possibly added beforehand to the hydroxyl-containing reactant and/or to the isocyanate group-containing reactant. Such systems are widespread in the art under the title "Two component (polyurethane) systems" (2K systems) and are also available commercially as such. Also conceivable are multicomponent systems with more than two components; it may be the case that one component is not compatible with one or the other component, and that therefore these three components cannot be brought together until directly before application.

An alternative possibility is the provision of one-component systems (mixtures/1K system) in which, for example, the two reactant components and also the catalyst can be provided as a storable mixture by means of blocking of the reactive groups of the individual reactants, as for example by blocking of the free isocyanate groups with suitable blocking agents. In the case of the 1K system, in the individual starting components or optionally in the starting mixture, there are in practice frequently other components present as well, such as solvents or coatings additives.

It is also known that polyurethanes, as coating materials or as a constituent of coating materials, in automotive refinish, for example, have a broad field of application. The polyurethane thus acts as a coating material. The corresponding formulations which comprise at least the polyurethane reactants and also a suitable catalyst, and optionally further components such as coatings additives or solvents, are also referred to as a coating material system or coating material composition.

Polyurethane coating materials, then, typically comprise a catalyst, for which not only acidic compounds but also, in particular, tertiary amines and/or metal compounds are employed, such as various tin compounds, more particularly dibutyltin dilaurate and dibutyltin oxide, for example.

In coating materials as well, the use of tin-containing catalysts is to be avoided, owing to the toxicity inherent in many alkyl-tin compounds. Dibutyltin oxide (DBTO) and dibutyltin dilaurate (DBTL) have been categorized accordingly by the EU Commission "Working Group on Classification and Labelling".

Accordingly, in the article "Catalysis of the Isocyanate-Hydroxyl Reaction by Non-Tin Catalysts" by Werner J. Blank, Z. A. He, and Ed. T. Hessell from King Industries Inc., available on the Internet at the address www.wernerblank.com (status: Oct. 9, 2014), are alternatives to the customary tin-containing catalysts are described, based on different metal salts and metal complexes, such as zirconium chelates, aluminum chelate, and bismuth carboxylate. There is, however, no description of catalysts based on lithium or on mixtures of bismuth with other metals.

U.S. Pat. No. 5,011,902 discloses a composition for the coating of plywood panels that comprises a noncellular polyurethane elastomer obtained by reacting a polyether or polyester polyol with a polyisocyanate in the presence of a catalyst. The catalyst comprises at least one bismuth compound, but may further comprise other metals as well, such as zinc, antimony, or lithium. The ratio of bismuth to lithium is optionally 1:6.6 to 1:1.6.

U.S. Pat. No. 4,256,847 describes a rigid polyurethane foam produced from a foamable mixture that comprises among other components an organic polyisocyanate, an organic polyol, and a catalyst consisting of a mixture of lithium and zinc salts of aliphatic or alicyclic organic monocarboxylic acids or mixtures of acids. The weight ratio of lithium to zinc can be up to 1:200, but is generally set at 1:2 to 1:25. The use of bismuth-containing catalysts, conversely, is not described.

WO 2012/123198 A1 describes a coating material composition which comprises at least one polyol, a polyisocyanate, a monomeric, aromatic, optionally substituted carboxylic acid (S) whose carboxyl group is in conjugation with a Π-electron system, and also, as catalyst, a zinc-amidine complex. There is no mention, though, of a catalyst containing lithium or containing bismuth.

The article "Replacing a veritable workhorse" in European Coatings Journal (issue: July-August 2008; 11 pages in total, Vincentz Network) describes the disadvantages of tin-containing catalysts in connection with polyurethane production; instead, catalysts based on bismuth and/or zinc can be used. But the use of lithium-containing catalysts is not described in this article.

It was an object of the present invention, therefore, to provide a new coating material system.

The object is achieved by means of a coating material system comprising components (A) to (C):

(A) at least one polyhydroxy group-containing compound, (B) at least one polyisocyanate-containing compound, and (C) at least one catalyst which comprises lithium (Li) and bismuth (Bi) as metal components and where the molar ratio of lithium to bismuth is at least 7:1 [mol/mol], where i) components (A), (B), and (C) are present separately from one another or ii) are mixed wholly or at least partly with one another.

Among the features of the coating material system of the invention are that the use of toxic, tin-containing catalysts can be avoided and/or that rapid curing is ensured.

An advantage is also to be seen more particularly in the fact that a molar lithium:bismuth ratio of at least 7:1 results in an unexpected, clear shortening of the curing times. If the catalyst also includes zinc, particularly at a molar lithium:zinc ratio of at least 6:1, there is likewise a (further) shortening in the curing time.

Furthermore, it has surprisingly been found that the coating material systems, when using polyhydroxy group-containing compounds having acid numbers of not more than 9 mg KOH/g, cure more rapidly than comparable coating material systems which comprise polyhydroxy group-containing compounds having higher acid numbers.

A further advantage of the coating material systems of the invention is to be seen in their use for automotive refinishing and for the coating of commercial vehicles. The coating material systems of the invention ensure good assembly strength after just a very short time. As a result, rapid curing is ensured even under the conditions of refinishing and of the finishing of commercial vehicles—that is, after curing at 60° C. for just 30 minutes, curing is already at such an advanced stage that initial assembly work or demasking operations can be carried out without damage to the coating.

For the purposes of the present invention, the terms "binder content" or "binder fraction" and "binder content determination" refer (unless stated otherwise) to the following:

The "binder content" is in each case the fraction of the coating material system that is soluble in tetrahydrofuran (THF), said system comprising components (A) to (C) and also, optionally, (D) to (J). The binder content is determined before the components of the coating material system begin to cure, in other words before curing to give the polyurethane. For the determination, the individual components of the coating material system in question are mixed completely with one another and then a small sample (P) of 1 g of the coating material system is weighed out and dissolved in 100 times the amount of THF, insoluble constituents are removed by filtration, the THF is evaporated off, and then the resulting solids content of the constituents previously dissolved in THF is ascertained by drying at 130° C. for 60 minutes, cooling in a desiccator, and then reweighing. The residue corresponds to the binder content of the sample (P).

The coating material system of the invention and also the other subjects of the present invention are defined in more detail hereinbelow.

The first subject of the present invention is the coating material system already set out above, comprising components (A) to (C) and also, optionally, a further component (D) to (J).

The coating material system of the invention comprises as its component (A) at least one polyhydroxy group-containing (polyhydroxyl group-containing) compound. As polyhydroxy group-containing compound of component (A) it is possible to use all compounds known to the skilled person that have at least two hydroxyl groups per molecule. The number of hydroxyl groups (hydroxy groups) per molecule may be arbitrarily high; it is specified by way of the hydroxy number (OH number), as described hereinafter. The compounds of component (A) are also referred to as "polyols"; they may be oligomeric and/or polymeric. As component (A) it is therefore also possible to use mixtures of two or more oligomeric and/or polymeric polyols (polyhydroxy group-containing compounds).

The polyhydroxy group-containing compounds of component (A) preferably have mass-average molecular weights $M_w \geq 500$ daltons, more particularly $M_w \geq 1000$ daltons. The $M_w$ can be determined by means of gel permeation chromatography (GPC) against a polystyrene standard (see also below in the experimental section). Further preferred are mass-average molecular weights $M_w$ of between 1000 and 20 000 daltons, more particularly between 1500 and 10 000 daltons.

The polyols preferably have an OH number of 30 to 400 mg KOH/g (polyol), more particularly between 100 and 300 KOH/g. The hydroxyl number (OH number) indicates how many mg of potassium hydroxide are equivalent to the amount of acetic acid bound by 1 g of substance (polyol) in the acetylation (of the corresponding polyol with acetic acid). For the determination, the sample is boiled with acetic anhydride-pyridine and the acid formed is titrated with potassium hydroxide solution (DIN 53240-2 (2007-11)). In the case of pure poly(meth)acrylates, the OH number may also be determined with sufficient precision by calculation on the basis of the OH-functional monomers employed.

It is preferred, moreover, for the polyols to have an acid number of between 0 and 30 mg KOH/g. With preference the acid number of the polyhydroxy group-containing compound of component (A) is not more than 9 mg KOH/g of the corresponding polyhydroxy group-containing compound, preferably not more than 7 mg KOH/g of the corresponding polyhydroxy group-containing compound, more particularly 0.5 to 5 mg KOH/g of the corresponding polyhydroxy group-containing compound.

The acid number here indicates the number of mg of potassium hydroxide consumed in the neutralization of 1 g of the respective compound (polyol/polyhydroxy group-containing compound) (DIN EN ISO 2114:2006-11).

If the polyols have a low acid number, preferably of not more than 9 mg KOH/g of the corresponding polyhydroxy group-containing compound, it is preferable for the polyol in question i) to be based on monomers which have completely esterified acid functions, these monomers preferably being purified prior to their use; ii) to be based on monomers which have only a small amount of free acid functions, or none, the monomers preferably comprising no acid group-containing monomers, more particularly no acrylic acid or no methacrylic acid; and/or iii) to be based on monomers which comprise no phosphate group-containing monomers ($PO_4$-containing monomers). With preference all three of the aforesaid options are realized.

The glass transition temperatures ($T_G$ values) of the polyols, measured by means of DSC measurements according to DIN EN ISO 11357-2:2011-04-28, may take on any desired values, and are preferably between −150 and 150° C., more preferably between 40 and 120° C.

Preferred polyhydroxy group-containing compounds (polyols) are polyester polyols, polyurethane polyols, polysiloxane polyols, polyacrylate polyols and/or polymethacrylate polyols. Examples of such compounds are listed in Poth, Schwalm, Schwarz: Acrylatharze. Vincentz Verlag Hannover, ISBN: 9783866308718. The aforesaid classes of polymer such as polyacrylate polyols or polymethacrylate polyols may all be used in each case as a homopolymer or as a copolymer (chain-growth copolymer) of at least two different monomers. In the context of the present invention, copolymers are used with preference as polyhydroxy group-containing compounds, particularly in the aforesaid classes of polymer. The classes of polymer are based on at least one hydroxy group-containing monomer building block. Monomers (monomer building blocks) suitable for the particular class of polymer are known to the skilled person. The skilled person also knows the specific (polymerization) processes that can be used for producing the respective polymers from the corresponding monomers. Furthermore, there may also be mixtures of at least two different specific polymers of one class of polymer, and/or mixtures of in each case at least one specific polymer from at least two different classes of polymer, present. It is also possible for copolymers to be present, these being polymers comprising fragments which can be assigned to two or more classes of polymer.

Suitable polyester polyols are described in EP-A-0 994 117 and EP-A 1 273 640, for example. Polyurethane polyols are prepared preferably by reaction of polyester polyol prepolymers with suitable di- or polyisocyanates and are described in EP-A 1 273 640, for example. Suitable polysiloxane polyols are described in WO-A-01/09260, for example, where the polysiloxane polyols recited therein may be employed preferably in combination with further polyols, more particularly those having higher glass transition temperatures.

Component (A) more preferably comprises one or more polyacrylate polyols and/or polymethacrylate polyols. The two aforesaid polymers or classes of polymer are also referred to as poly(meth)acrylate polyols. Together with the polyacrylate polyol(s) and/or polymethacrylate polyol(s) it is possible for further oligomeric and/or polymeric polyhydroxyl group-containing compounds to be used, examples being polyester polyols, polyurethane polyols, and polysiloxane polyols, more particularly polyester polyols.

The poly(meth)acrylate polyols used with more preference as component (A) in accordance with the invention are based preferably on at least one of the monomers (monomer building blocks) listed below. Used more preferably for this purpose is at least one of the following hydroxyl-containing monomer building blocks and optionally at least one of the following monomer building blocks which are not hydroxyl-containing monomer building blocks. Employed with particular preference are copolymers based on at least one hydroxyl-containing monomer building block and at least one monomer building block which contains no hydroxyl groups. Examples of the corresponding monomer building blocks are listed below.

Hydroxyl-containing monomer building blocks used for the poly(meth)acrylate polyols are preferably hydroxyalkyl acrylates and/or hydroxyalkyl methacrylates. They are preferably selected from 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate and/or 4-hydroxybutyl methacrylate. Particularly preferred are the hydroxyl-containing monomer building blocks 4-hydroxybutyl acrylate and/or 4-hydroxybutyl methacrylate. The hydroxyl-containing monomer building blocks are used preferably at 20 to 60 wt %, based on the total monomer amount for the respective polymer.

Further monomer building blocks used for the poly(meth)acrylate polyols are preferably alkyl acrylates and/or alkyl methacrylates. They are preferably selected from methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate, lauryl methacrylate, cycloalkyl acrylates and/or cycloalkyl methacrylates. Preferred cycloalkyl (meth)acrylates are cyclopentyl acrylate, cyclopentyl methacrylate, isobornyl acrylate, isobornyl methacrylate, or, in particular, cyclohexyl acrylate and/or cyclohexyl methacrylate. Where the above monomers are used, they are employed preferably in amounts of 35 to 80 wt %, based on the total monomer amount.

Further monomer building blocks used for the poly(meth)acrylate polyols may be vinylaromatic hydrocarbons, such as vinyltoluene, alpha-methylstyrene, or in particular, styrene, amides or nitriles of acrylic or methacrylic acid, vinyl esters or vinyl ethers, and also acrylic and/or methacrylic acid. If vinylaromatic hydrocarbons are used as monomers, they are employed preferably in amounts of 0.1 to 40 wt %, based on the total monomer amount. If acrylic and/or methacrylic acid is used, this is done preferably in amounts of 0.1 to 5 wt %, based on the total amount of the monomers used.

Furthermore it is possible to use monomer building block compounds which possess a phosphate group. They are prepared by reaction of suitable hydroxyl-containing (meth) acrylic compounds by transesterification.

Such monomers are represented preferably by the general formula (1):

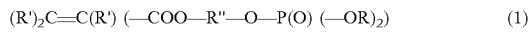
(R')$_2$C=C(R''') (—COO—R''—O—P(O) (—OR')$_2$)  (1)

where R'=H or CH$_3$
R''=alkyl or alkyl-O-alkyl, and
R'''=H or alkyl.

In the aforesaid radicals R', R'', and R''', alkyl may be branched or unbranched and may optionally be cyclic. The term "alkyl" refers in the context of the present invention to saturated hydrocarbon radicals having at least one carbon atom, such as methyl (C$_1$ alkyl), ethyl (C$_2$ alkyl), or hexyl (C$_6$ alkyl). There is in principle no limit on the number of carbon atoms; preferably there are not more than 18 C atoms per alkyl. If present, such monomers are used in amounts of 0.1 to 20 wt %, based on the total monomer amount. Monomers of these kinds are available commercially, in the form for example of Sipomer PAM® from Rhodia Solvay Group.

The poly(meth)acrylate polyols particularly preferred as component (A) in accordance with the invention are preferably copolymers and preferably have mass-average molecular weights Mw of between 1000 and 20 000 daltons, more particularly between 1500 and 10 000 daltons, measured in each case by means of gel permeation chromatography (GPC) against a polystyrene standard.

The glass transition temperature of the poly(meth)acrylate polyols is generally between −150 and 150° C., more particularly between −40 and 120° C. (measured by means of DSC measurements according to DIN-EN-ISO 11357-2: 2011-04-28).

The poly(meth)acrylate polyols preferably have an OH number of 60 to 250 mg KOH/g (polyol), more particularly between 70 and 200 mg KOH/g.

It is preferred, moreover, for the poly(meth)acrylate polyols to have an acid number of between 0 and 30 mg KOH/g. With preference the acid number of the poly(meth)acrylate polyols of component (A) is not more than 9 mg KOH/g of the corresponding poly(meth)acrylate polyols, preferably not more than 7 mg KOH/g of the corresponding poly(meth) acrylate polyols, more particularly 0.5 to 5 mg KOH/g of the corresponding poly(meth)acrylate polyols.

The acid number here indicates the number of mg of potassium hydroxide consumed in the neutralization of 1 g of the respective compound (poly(meth)acrylate polyols) (DIN EN ISO 2114:2006-11).

If the poly(meth)acrylate polyols which are used as component (A) have a low acid number, preferably an acid number of not more than 9 mg of KOH per gram of the corresponding poly(meth)acrylate polyols, it is preferred for the corresponding poly(meth)acrylate polyol to be based on the following monomeric building blocks (the weight percentage figures are based in each case on the total monomer amount in the polymer in question):

20 to 60 wt % of at least one hydroxyalkyl acrylate or hydroxyalkyl methacrylate (as defined above), 35 to 80 wt % of at least one alkyl acrylate or alkyl methacrylate (as defined above), and 0 to 40 wt %, preferably 0.1 to 40 wt %, of at least one vinylaromatic hydrocarbon (as defined above), preferably of styrene.

In connection with the above-recited poly(meth)acrylate polyols having a low acid number, it is further preferred that they are prepared using only a very small amount (not more than 0.5 wt %), or none, of monomers which possess a free acid function and/or which comprise a phosphate group. In this connection, more particularly, only small amounts, or none, are used of monomers selected from acrylic acid, methacrylic acid, or phosphate group-containing monomers of the above-described general formula (1).

In the coating material system of the invention, component (A) may be present in principle in any desired proportions known to the skilled person. The proportion of component (A) is preferably from 30 to 80 wt %, more preferably from 50 to 70 wt %, based in each case on the binder content of the coating material system.

The coating material system of the invention comprises as its component (B) at least one polyisocyanate-containing compound. The polyisocyanate-containing compound which can be used includes all of the compounds known for this purpose to the skilled person (see, for example, in Ulrich Meier-Westhues: Polyurethane. Lacke, Kleb- and Dichtstoffe. Vincentz-Verlag, ISBN: 9783866308961, April 2007). Suitability as component (B) is possessed, for example, by substituted or unsubstituted aromatic, aliphatic, cycloaliphatic and/or heterocyclic polyisocyanates that are known per se.

Examples of preferred polyisocyanate-containing compounds are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylylene diisocyanates (TMXDI; commercially available for example as TMXDI® from American Cyanamid), and mixtures of the aforementioned polyisocyanates. TMXDI is also referred to as m-TMXDI; bisisocyanatopropylbenzene; m-phenyldimethyl diisocyanate; m-tetramethylxylylene diisocyanate; tetramethyl-m-xylylene diisocyanate; 1,3-bis(2-isocyanato-2-propyl)benzene or 1,3-bis(alpha-isocyanatoisopropyl) benzene.

Preferred polyisocyanate-containing compounds are also the biuret dimers and iminooxadiazinediones of the aforementioned diisocyanates. Also preferred are 1,6-hexamethylene diisocyanate (HMDI), isophorone diisocyanate (IPDI), and 4,4'-methylenedicyclohexyl diisocyanate, the biuret dimers thereof and/or the iminooxadiazinediones thereof and/or the asymmetrical trimers thereof, such as the asymmetric HDI trimer with fractions of asymmetrical trimers that is obtainable commercially under the name Desmodur N3900.

More preferred polyisocyanate-containing compounds are selected from 1,6-hexamethylene diisocyanate, isophorone diisocyanate, 4,4'-methylenedicyclohexyl diisocyanate, the biuret dimers of the aforementioned diisocyanates, the iminooxadiazinediones of the aforementioned diisocyanates and/or the asymmetrical trimers of the aforementioned diisocyanates.

In another embodiment of the invention, the polyisocyanates are polyisocyanate prepolymers having urethane structural units, which are obtained by reaction of polyols with a stoichiometric excess of aforementioned polyisocyanates. Polyisocyanate prepolymers of this kind are described in U.S. Pat. No. 4,598,131, for example.

Polyisocyanate-containing compounds of component (B) may be present in a suitable solvent (J), as further set out later on below in connection with the solvent (J) and also with the production method for the coating material system of the invention.

If the coating material system of the invention is to be provided as a one-component system (1K system), then preference is given to selecting polyisocyanate group-containing compounds (B) whose free isocyanate groups are blocked with blocking agents. The isocyanate groups may for example be blocked with substituted pyrazoles, more particularly with alkyl-substituted pyrazoles such as 3-methylpyrazole, 3,5-dimethylpyrazole, 4-nitro-3,5-dimethylpyrazole, or 4-bromo-3,5-dimethylpyrazole. Particular preference is given to blocking the isocyanate groups of component (B) with 3,5-dimethylpyrazole. For the formation of polyurethanes (crosslinked urethanes), the polyisocyanates thus blocked are reacted with (further) components (A) at elevated temperature, with a network structure being built up for example by transurethanization and release of the blocking component. At the temperatures prevailing, the blocking agent may optionally escape wholly or partly, or else may remain entirely within the coating film as a further component.

Component (B) in the coating material system of the invention may be present in principle in any desired amounts known to the skilled person. The proportion of component (B) is preferably from 20 to 50 wt %, more preferably from 25 to 40 wt %, based in each case on the binder content of the coating material system.

It is preferred, moreover, for the weight fractions of component (A) and of component (B) in the coating material system of the invention to be selected such that the molar equivalents ratio of the hydroxyl groups of the polyhydroxyl group-containing compounds of component (A) to the isocyanate groups of the polyisocyanate-containing compound of component (B) is between 1:0.9 and 1:1.5, preferably between 1:0.9 and 1:1.2, more preferably between 1:0.95 and 1:1.1. If there is also a hydroxyl group-containing compound of component (D) present in the coating material system of the invention, then its proportion in terms of the aforesaid molar equivalents ratios is taken into account in the weight fraction of component (A). In other words, in this scenario, the sum total of the hydroxyl groups of the polyhydroxy group-containing compound of component (A) and the hydroxyl-containing compound of component (D) is to be taken into account.

The coating material system of the invention comprises as its component (C) at least one catalyst which comprises lithium (Li) and bismuth (Bi) as metal components, and where the molar ratio of lithium to bismuth is at least 7:1 [mol/mol].

Catalysts as such which comprise metal components such as lithium or bismuth in molar proportions, for example, of 1:1 and which are suitable for the preparation of polyurethanes are known to the skilled person. The skilled person knows how a molar ratio of the metal components lithium to bismuth of at least 7:1 [mol/mol] can be set in the catalyst. The metal components can be used in the catalyst in the form of salts of at least one organic acid. The metal here is the cation, the organic acid, the anion of the corresponding salt. Mixtures of organic acids can also be used as anion. The organic acids have hydrocarbon fragments, and preferably are (long-chain) carboxylic acids having 2 to 30 carbon atoms, more preferably having 6 to 18 carbon atoms ($C_6$-$C_{18}$ carboxylic acids), very preferably having 8 to 12 carbon atoms ($C_8$-$C_{12}$ carboxylic acids), such as 2-ethylhexanoic acid, n-octanoic acid, or neodecanoic acid. The catalysts may also take the form of an alcoholic solution, in the case of zinc-containing catalysts, for example, or the form of a solution in the corresponding organic acid, in the case of bi-neodecanoate, for example. Additionally there may be further substances present, useful for stabilizing the compounds against traces of water or else useful for preventing the tendency toward crystallization.

For example, the catalysts of component (C) may be prepared by mixing of the corresponding salts of organic acids in the appropriate molar ratios. Here it is also possible for the catalyst of component (C) to be prepared only in situ in the coating material system of the invention. For example, the lithium-containing component and the bismuth-containing component of the catalyst may first be provided separately from one another or in each case as a mixture with in each case one of the components (A) or (B).

Besides the lithium and bismuth metal components, the catalysts of component (C) may also comprise further metal components as well other than lithium and bismuth. Further metal components include in principle all metals known to the skilled person in connection with the production of polyurethane or coating material systems. The further metal components may in principle be used in any desired molar ratios to lithium and/or bismuth. Used as further metal component with preference is zinc (Zn), zirconium (Zr) and/or aluminum (Al), more particularly zinc (Zn).

The catalyst is preferably in the form of a salt, more preferably an Li salt and/or Bi salt, with $C_6$-$C_{18}$ carboxylic acids as anion component of the respective salt, more preferably still an Li salt and/or Bi salt with $C_8$-$C_{12}$ carboxylic acid, more particularly Bi octoate, Li octoate, Li salt or Bi salt of $C_{10}$ neodecanoic acid, and/or Li salt or Bi salt of $C_9$ neononanoic acid.

More preferably the catalyst of component (C) has a molar ratio of lithium to bismuth of 7.5:1 to 12:1 [mol/mol], more particularly of 8:1 to 10:1 [mol/mol].

Where a catalyst is used which additionally has zinc as metal component, it is preferred for the molar ratio of lithium to zinc to be at least 5:1 [mol/mol], preferably from 6:1 to 12:1 [mol/mol], more particularly 7.5:1 to 10:1 [mol/mol].

The catalyst of component (C) may be present in principle in any desired amounts known to the skilled person in the coating material system of the invention. Component (C) preferably has a fraction of 35 to 2000 ppm by weight, more preferably of 35 to 1000 ppm by weight, and very preferably of 100 to 1000 ppm by weight, based in each case on the binder content of the coating material system.

In the coating material system of the invention there may optionally be other catalysts used additionally, apart from the above-described catalysts of component (C), these additional catalysts being known to the skilled person in connection with the preparation of polyurethanes or production of coating material systems, but not falling within the definition of the catalysts of component (C).

As already mentioned at the outset, the above-defined components (A) to (C) may i) be present separately from one another or ii) may be mixed completely or at least partially with one another, in the coating material system of the invention. Where components (A) to (C) are present separately from one another, according to the first option, the system in question is preferably the two-component system (2K system) already mentioned above, the definition of a 2K system also comprehending those systems in which three or more different components are provided. 2K systems for the purposes of the present invention are in principle all coating material systems where components (A) and (B) are present separately from one another, in particular prior to the application of the system in question, as for example in the formation of a polyurethane or of a coating material.

This also means, however, that the coating material systems encompassed in the case of the aforementioned second option, second variant, in which the components (A) to (C) are at least partly mixed with one another, are likewise to be interpreted as a 2K system in the sense of the present invention, provided components (A) and (B) are present separately from one another. In this scenario, however, component (C) may be mixed at least partly or completely with one or both components (A) and (B).

The term "at least partly mixed with one another" has the present meaning in the context of the present invention, this meaning being illustrated exemplarily with an example. For example, component (C) is mixed with component (A), whereas component (B) is present separately to this mixture of (A) and (C). Optionally, however, it is also possible for component (B) to be mixed with a portion of component (C). Furthermore, the mixtures of (A) and (C) and also of (B) and (C) may additionally comprise at least one optional component as defined hereinafter.

Where components (A) to (C) are mixed completely with one another in the coating material system of the invention, in accordance with above-defined second option, first variant, the system in question is preferably a one-component system (1K system) as already mentioned above, in which the free isocyanate groups of component (B) are blocked preferably by suitable blocking agents.

It is possible for the individual components (A) to (C) to be provided each in portions, with individual portions possibly mixed in turn with other components, examples being the optional components described hereinafter. Preferably, however, components (A) and (B) are provided not in parts, but instead in each case as an individual (complete) component. As described above, however, the catalyst of component (C) in particular may be at least partly mixed with one another in portions and/or in part-components of at least one of the two components (A) and/or (B). In this scenario, the catalyst of component (C) is prepared preferably in situ immediately prior to the application of the coating material system in question.

In accordance with the invention, all of components (A) to (C) and also, optionally, the optional components described below for the respective coating material system are mixed completely with one another no later than (immediately) prior to the desired application, irrespective of whether the system is a 1K system or a 2K system. Examples of (desired) applications are described in the text below. In the context of these applications, the curing of the coating material system of the invention, already described above, takes place, with formation of polyurethane, by reaction of the components (A) and (B). In view of the in some cases high reactivity of these two components, it is frequently advantageous for these components to be provided separately from one another in the context of the coating material system (i.e., prior to the desired application) (and also in connection with an increased storage stability). Consequently, the polyurethane reaction in the context of the desired application can be regulated and controlled more effectively and/or in a more targeted way.

Besides the components (A) to (C) already described above, the coating material systems of the invention may optionally further comprise at least one further component (D) to (J), which are specified hereinafter.

The optional components (D) to (J) are selected from hydroxyl-containing compounds (D), aminoplast resins and/or tris(alkoxycarbonylamino)triazines (E), coatings additives (F), pigments (H), other fillers (I) and/or solvents (J).

In analogy to the components (A) to (C) described above, the optional components (D) to (J) may also be present separately from one another or may be mixed wholly or at least partly with one another and/or mixed with the components (A) to (C).

As an optional component, the coating material system of the invention comprises preferably at least one further component selected from hydroxyl-containing compounds (D), coatings additives (F), pigments (H) and/or solvents (J).

The coating material system of the invention comprises optionally as optional component (D) at least one hydroxyl-containing compound. Hydroxyl-containing (hydroxy group-containing) compounds as such are known to the skilled person. The hydroxyl-containing compound (D) generally has two or more hydroxyl groups, preferably two hydroxyl groups. In the context of the present invention, the hydroxyl-containing compound (D) does not fall within the definition of the above-described polyhydroxy group-containing compound (A).

The hydroxyl group-containing compounds (D) are preferably monomeric compounds and/or compounds having a molecular weight <500 g/mol, preferably <200 g/mol. The hydroxyl-containing compounds (D) are also referred to as low molecular mass polyols.

Component (D), where present, has a fraction of 0.5 to 20 wt %, more preferably of 1 to 10 wt %, very preferably of 1 to 5 wt %, based in each case on the binder content of the coating material system.

Preferred examples of a hydroxyl-containing compound (D) that are used are ethylene glycol, neopentyl glycol, 1,3-butanediol, 1,2-propanediol, or diols of dimerized and subsequently hydrogenated natural fatty acids (trade name Sovermol® 908). Preference is given to admixing those (low molecular mass) polyols of component (D) in minor fractions of the polyol component (A)—for example, at 1 to 20 wt %, based on the amount of component (A).

The coating material system of the invention comprises optionally, as optional component (E), at least one aminoplast resin and/or at least one tris(alkoxycarbonylamino) triazine. Compounds which fall within component (E) of the present invention are known to the skilled person. Where present, component (E) has a fraction of 0.5 to 30 wt %, preferably of 0.5 to 15 wt %, based on the binder content of the coating material system.

Examples of suitable tris(alkoxycarbonylamino)triazines are specified in U.S. Pat. Nos. 4,939,213, in 5,084,541, and in EP-A 0 624 577.

Examples of suitable aminoplast resins (E) are all aminoplast resins commonly employed in the coatings industry sector, the reactivity of the aminoplast resin allowing the properties of the resulting coating materials to be controlled. The resins in question are condensation products of aldehydes, more particularly formaldehyde, and, for example, urea, melamine, guanamine, and benzoguanamine. The aminoplast resins comprise alcohol groups, preferably methylol groups, which in general are etherified partly or, preferably, completely with alcohols. Aminoplast resins etherified with lower alcohols are used more particularly. Preferred aminoplast resins used are those etherified with methanol and/or ethanol and/or butanol, examples being products available commercially under the names Cymel®, Resimene®, Maprenal®, and Luwipal®.

The aminoplast resins (E) are long-established compounds and are described for example in detail in the American patent application US 2005/0182189 A1, page 1, paragraph [0014], to page 4, paragraph [0028].

The coating material system of the invention comprises optionally, as optional component (F), at least one coatings additive. Coating additives as such are known to the skilled person. Where present, a coatings additive (F) has a fraction of 0.5 to 30 wt %, preferably of 0.5 to 25 wt %, and more particularly of 1 to 20 wt %, based in each case on the binder content of the coating material system.

Examples of suitable coatings additives (F) are:
in particular, UV absorbers such as, for example, 2-(2-hydroxyphenyl)benzotriazoles, 2-hydroxybenzo phenones, hydroxyphenyl-s-triazines, and oxalanilides;
in particular, light stabilizers such as those known as HALS compounds ("hindered amine light stabilizers"; these are derivatives of 2,2,6,6-tetramethylpiperidine; available commercially for example as Tinuvin®292 from BASF SE), benzotriazoles such as hydroxyphenylalkylbenzotriazole, or oxalanilides;
radical scavengers;
slip additives;
polymerization inhibitors;
defoamers;
reactive diluents different from components (A) and (D), more particularly reactive diluents which become reactive only through reaction with other constituents and/or with water, such as Incozol or aspartic esters, for example;
wetting agents different from components (A) and (D), such as silxoanes, fluorine-containing compounds, carboxylic monoesters, phosphoric esters, polyacrylic acids and copolymers thereof, or polyurethanes;
adhesion promoters;
flow control agents, especially those based on a polyacrylate. Employed preferably here are copolymers of ethylhexyl acrylate and ethyl acrylate. These copolymers preferably have a very low $T_G$, are relatively nonpolar, and have a low OH number;
film-forming assistants such as cellulose derivatives;
fillers in the form of nanoparticles based on silicon dioxide, aluminum oxide, or zirconium oxide; for further details, refer to Römpp Lexikon "Lacke and Druckfarben" Georg Thieme Verlag, Stuttgart, 1998, pages 250 to 252;
rheology control additives different from components (A) and (D), such as the additives known from patents WO 94/22968, EP-A-0 276 501, EP-A-0 249 201, or WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils®; or synthetic polymers having ionic and/or associative groups such as poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes, or polyacrylates;
flame retardants.

The coating material system of the invention comprises optionally, as optional component (H), at least one pigment. Suitable pigments as such are known to the skilled person (see, for example, in Thomas Brock, Michael Groteklaes, Peter Mischke: European Coatings Handbook, Vincentz Verlag, ISBN 3-86630-849-3).

The fraction of the pigments may in principle be arbitrary; it is preferably situated within a P/B range from 0.1 to 3.0 (P/B describes the weight ratio of pigment (P) to binder (B); binder is to be understood in this case as the sum total of all film-forming components of the coating system).

In accordance with the invention, pigments are used more particularly when the aim with the coating material compositions is to produce pigmented topcoats or pigmented undercoats, more particularly pigmented topcoats.

The coating material system of the invention optionally comprises, as optional component (I), at least one other filler. Other fillers as such are known to the skilled person. Where present, the other filler (I) has a fraction of 0.1 to 30 wt %, based in each case on the binder content of the coating material system.

Examples of suitable other fillers (I) are carbonates, silicon dioxides, or barium sulfates, as they are or else in modified form. In contrast to the fillers described above as examples of coatings additives (F), the other fillers (I) are not nanoscale particles.

The coating material system of the invention optionally comprises, as optional component (J), at least one solvent. Solvents as such, especially in connection with the production of polyurethane or of coating material systems, are known to the skilled person. Where present, the solvent (J) has a fraction of 20% to 80%, preferably of 30% to 50%, based in each case on the total amount of the coating material system of the invention.

Preferred solvents used are those suitable for dissolving the polyisocyanate-containing compounds of component (A) and/or of component (B).

Suitable solvents (J) are those which permit sufficient solubility of the polyisocyanate component and are free from groups reactive toward isocyanates. Examples of solvents of this kind are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, butylal, 1,3-dioxolane, glycerol formal, benzene, toluene, xylene, n-hexane, cyclohexane, Solventnaphtha®, 2-methoxypropyl acetate (MPA), and ethyl ethoxypropionate.

In one embodiment of the present invention, the coating material system of the invention comprises at least one further component (D) to (J), selected from hydroxyl-containing compounds (D), aminoplast resins and/or tris (alkoxycarbonylamino)triazines (E), coatings additives (F), pigments (H), other fillers (I) and/or solvents (J), where
i) the individual components (D) to (J) are present separately from one another or
ii) are mixed wholly or at least partly with one another and/or with components (A) to (C).

It is preferred, furthermore, if
i) the coating material system is not aqueous, and/or
ii) components (A) and/or (B) each form a mixture with at least one solvent (J), but components (A) and (B) are present separately from one another, and/or
iii) the catalyst of component (C) is present entirely or at least partly in at least one of the components (A) or (B) present separately from one another, preferably in component (A).

Where the coating material system is not aqueous, this means that there is preferably no water at all present in such a coating material system, or that water may occur only in the form of impurities or traces, with a maximum amount of 0.1 wt %, preferably of 0.01 wt %, more particularly of 0.001 wt %, based in each case on the total weight of the corresponding coating material system.

In a further preferred embodiment, the coating material system of the invention is present as a complete mixture of components (A), (B), and (C) and also of optionally present components (D) to (J).

In one embodiment of the present invention the coating material system comprises the following components:
- 50 to 70 wt % (based on the binder content of the coating material system) of at least one polyhydroxy group-containing compound (A), preferably of at least one poly(meth)acrylate polyol,
- 25 to 40 wt % (based on the binder content of the coating material system) of at least one polyisocyanate-containing compound (B),
- 100 to 1000 ppm by weight (based on the binder content of the coating material system) of at least one catalyst (C),
- 0 to 10 wt %, preferably 1 to 5 wt % (based on the coating material system binder content) of at least one hydroxyl-containing compound (D),
- 0 to 25 wt %, preferably 1 to 10 wt % (based on the binder content of the coating material system) of at least one coatings additive (F), and
- 0 to 300 wt %, preferably 1 to 100 wt % (based on the binder content of the coating material system) of at least one pigment (H).

In this embodiment, moreover, the coating material system of the invention may also comprise at least one solvent (J). Where a solvent is present, it is included in amounts of 1 to 80 wt %, preferably 5 to 50 wt %, of at least one solvent (J). In contrast to the other components, the solvent content is based on the overall amount of the coating material system of the invention.

A further subject of the present invention, accordingly, is also a method for producing a coating material system as described above. The production method as such is known to the skilled person. If the mandatory components and also, optionally, the optional components of the coating material system are mixed wholly or at least partly with one another, the skilled person knows how such mixing can be implemented. The sequence and/or duration of the individual mixing steps are in principle arbitrary; all of the components may optionally be mixed simultaneously with one another. Where the mandatory components, and also those present optionally of the coating material system of the invention are present separately from one another they are analogously mixed immediately before the application of the coating material system in question.

In one embodiment the method of the invention for producing a coating material system is carried out such that components (A), (B), and (C) and also the optionally present components (D) and (J) are provided separately from one another and then mixed with one another. Mixing takes place preferably at room temperature; components (A) and (C) are mixed with one another beforehand and/or a mixture comprising component (A) is added.

The aforementioned embodiment is preferably carried out immediately before the specific application of the coating material system of the invention. This means that complete mixing of all of the mandatory components (A) to (C) present in the coating material system of the invention, and also the optionally present components (D) to (J), is not achieved until immediately before the specific application of the coating material system of the invention. The term "immediately before the specific application" embraces a time span from approximately one minute up to two hours.

A further subject matter of the present invention, therefore, is also a method for producing a polyurethane by at least partly or completely curing the above-described coating material system of the invention. The polyurethane is preferably fully cured. The curing of the coating material system of the invention takes place after complete mixing of all the components of the coating material system, more particularly after the mixing of components (A) and (B). If component (B), in the context of a 1K system, is to additionally be protected (blocked) with blocking agents, the blocking agent must first of all be removed before a urethane reaction can take place to produce the polyurethane of the invention. The method for producing the polyurethane therefore takes place preferably as part of a specific application of the coating material system. The production of a polyurethane as such, and the implementation of the curing, are known to the skilled person and have also already been acknowledged in the introductory part of the present invention.

Expressed in other words, this means that the desired/specific application of the coating material system of the invention forms polyurethane by curing of a coating material based on components (A) and (B) in the presence of the catalyst (C); the polyurethane is formed preferably in layer form or as a coating.

The curing of the coating material (system) of the invention that has been applied may also take place, however, after a certain resting time. The resting time serves, for example, for the flow and the degassing of the coating films, or for the evaporation of volatile constituents such as solvents. The resting time may be assisted and/or shortened by the application of increased temperatures and/or by a reduced atmospheric humidity, provided this does not entail any instances of damage or alteration to the coating films, such as premature complete crosslinking, for instance.

The thermal curing of the coating material system has no peculiarities in terms of method, but instead can take place in accordance with the customary and known methods such as heating in a forced air oven or irradiation with IR lamps. The thermal cure here may also take place in stages. Another preferred curing method is that of curing with near infrared (NIR radiation).

The thermal curing takes place advantageously at a temperature of 20 to 200° C. for a time of 1 min up to 10 h; at low temperatures, longer curing times may also be employed. For automotive refinishing and for the painting of plastics parts, and also for the painting of commercial vehicles, relatively low temperatures are usually employed, lying preferably between 20 and 80° C., more particularly between 20 and 60° C.

The polyurethane produced in accordance with the method of the invention preferably forms a layer or coating or is at least part of a layer or coating; the layer or coating is preferably a coating film.

The polyurethane preferably comprises at least one pigment (H) and/or the polyurethane is applied in layer form on a basecoat film, which optionally comprises at least one pigment (H), or on an optionally precoated substrate.

It is preferred, moreover, for the curing of the polyurethane to take place at temperatures of 20 to 80° C., preferably of 20 to 60° C., the optional basecoat film having optionally been dried beforehand at temperatures of 20° C. to 80° C.

A further subject of the present invention is therefore also a polyurethane which has been produced in accordance with the method as described above.

A further subject of the present invention is therefore also the use of the above-described coating material system of the invention and/or of the polyurethane of the invention, produced in accordance with a method as described above, as coating material, in automotive finishing, for the repair of finishes, for automotive refinishing and/or for the coating of parts for installation in or on automobiles, of plastics substrates, or of commercial vehicles, the coating material preferably being a clearcoat or a pigmented paint.

Since the coatings of the invention produced from the coating material systems of the invention exhibit outstanding adhesion even to already cured electrocoat systems, surfacer systems, basecoat systems, or customary and known clearcoat systems, they are outstandingly suitable not only for use in automotive production-line (OEM) finishing but also for automotive refinishing and/or for the coating of parts for installation in and on automobiles and/or for the coating of commercial vehicles.

Application of the coating material systems of the invention may be made by any customary application methods such as, for example, spraying, knifecoating, brushing, pouring, dipping, impregnating, trickling, or rolling. At the application, the substrate to be coated may itself be at rest, with the application equipment or unit being moved. Alternatively, the substrate to be coated, more particularly a coil, may also be moved, with the application unit being at rest relative to the substrate or being moved appropriately.

Preference is given to employing spray application methods, such as, for example, compressed air spraying, airless spraying, high-speed rotation, electrostatic spray application (ESTA), optionally in conjunction with hot spray application, such as hot air spraying, for example.

The coating materials of the invention are outstandingly suitable as decorative, protective and/or effect coatings and coating systems for bodies of means of transport (especially powered vehicles, such as bicycles, motorcycles, coaches, trucks, or automobiles) or parts thereof; for the interior and exterior of edifices; for furniture, windows, and doors; for plastics moldings, more particularly CDs and windows; for small industrial parts, and for coils, containers, and packaging; for white goods; for films; for optical, electrical, and mechanical components; and also for hollow glassware and articles of everyday use.

The coating material systems of the invention can therefore be applied, for example, to an optionally precoated substrate, it being possible for the coating materials of the invention to be either pigmented or unpigmented. The coating material systems and paint systems of the invention, more particularly the clearcoat systems, are employed in particular in the technologically and esthetically particularly demanding field of automotive production-line (OEM) finishing and for the coating of plastics parts for installation in or on automobile bodies, more particularly for top-class automobile bodies, such as, for example, for producing roofs, tailgates, hoods, fenders, bumpers, spoilers, sills, protective strips, side trim, and the like, and also for automotive refinishing and for the finishing of commercial vehicles, such as, for example, of trucks, chain-driven construction vehicles, such as crane vehicles, wheel loaders, and concrete mixers, for example, buses, rail vehicles, watercraft, aircraft, and also agricultural equipment such as tractors and combines, and parts thereof.

The plastics parts consist customarily of ASA, polycarbonates, blends of ASA and polycarbonates, polypropylene, polymethyl methacrylates, or impact-modified polymethyl methacrylates, more particularly of blends of ASA and polycarbonates, preferably with a polycarbonate fraction >40%, more particularly >50%.

"ASA" refers in general to impact-modified styrene/acrylonitrile polymers, in which graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

With particular preference the coating materials of the invention are employed in multistage coating processes, more particularly in processes in which an optionally precoated substrate is coated first with a pigmented basecoat film and thereafter with a film with the coating material composition of the invention. Also subject matter of the invention, accordingly, are multicoat color and/or effect finishes comprising at least one pigmented basecoat film and at least one clearcoat film disposed thereon, these finishes being characterized in that the clearcoat film has been produced from the coating material composition of the invention.

Not only water-thinnable basecoats but also basecoats based on organic solvents can be used. Examples of suitable basecoats are described in EP-A 0 692 007 and in the documents recited at column 3, lines 50 ff., therein. The applied basecoat is preferably first dried—that is, at least some of the organic solvent and/or water is removed from the basecoat film in an evaporation phase. Drying takes place preferably at temperatures from room temperature to 80° C. After drying has taken place, the coating material composition of the invention is applied. The two-coat finish is subsequently baked, preferably under conditions employed in the context of automotive OEM finishing, at temperatures of 20 to 200° C., for a time of 1 min up to 10 h; in the case of the temperatures employed for automotive refinishing, which are in general between 20 and 80° C., more particularly between 20 and 60° C., longer cure times may also be employed.

In a further preferred embodiment of the invention, the coating material system of the invention is used as a transparent clearcoat for the coating of plastics substrates, more particularly of plastics parts for interior or exterior installation. These plastics parts for interior or exterior installation are preferably coated likewise in a multistage coating process, in which an optionally precoated substrate or a substrate pretreated for enhanced adhesion of the subsequent coatings (for example by flaming, corona treatment, or plasma treatment of the substrate) is coated first with a pigmented basecoat film and thereafter with a film with the coating material composition of the invention.

A further subject of the present invention is therefore also a method for producing a coating, in which at least one coating material system of the invention is applied to an optionally precoated substrate or to a basecoat film.

The coating (layer, film) preferably comprises a polyurethane obtained by at least partial or complete curing, preferably by complete curing, of the coating material system.

A further subject of the present invention is therefore also a coating (or layer) obtainable by the above-described process for producing the coating.

A further subject of the present invention is therefore also the use of a catalyst which comprises lithium (Li) and bismuth (Bi) as metal components and where the molar ratio of lithium to bismuth is at least 7:1 [mol/mol], in a coating material system of the invention as described above, for the catalysis of the urethane reaction in a coating material system, for the production of polyurethanes, for the production of a polyurethane in accordance with the observations above, for the production of a coating in accordance with the observations above, for the production of a paint, for automotive refinishing, and/or for the coating of parts for installation in or on automobiles, of plastics substrates, or of commercial vehicles.

A further subject of the present invention is therefore also the catalyst as such that is used as component (C) in the coating material system of the invention as described above. The catalyst of the invention is therefore a catalyst which comprises lithium (Li) and bismuth (Bi) as metal components, and where the molar ratio of lithium to bismuth is at least 7:1 [mol/mol].

The invention is illustrated below with examples.

1. Component A

Preparation of an Inventive Polyacrylate Polyol

A 4 l stainless steel reactor in pressure design, equipped with two feed vessels, a reflux condenser, and a stirring member, is charged with 487 g of butyl acetate. One of the feed vessels is charged with a mixture of 479 g of styrene, 242.2 g of methyl methacrylate, 164 g of n-butyl acrylate, 298 g of butyl methacrylate, 33.4 g of methacrylic acid, and 763 g of hydroxypropyl methacrylate. The second feed vessel is charged with 198 g of tert-butyl per-2-ethylhexanoate with 86 g of butyl acetate. At a pressure of 3 bar absolute, the reactor charge is heated to 140° C. When the temperature is reached, the initiator feed is started; the overall feed time is 270 minutes. 5 minutes after the start of the initiator feed, the monomer feed is commenced, and is fed in over 240 minutes. After the end of both feeds, the batch is held at 140° C. for a further 60 minutes, after which it is cooled down and let down. The solids content of the resin solution is adjusted with methyl ethyl ketone to 65%±1%.

The polyacrylate polyol thus synthesized (in the form of a solid resin) has an acid number of 14.1 mg KOH/g resin solids and a solids content of 64.0%. The viscosity of the resin solution is 3483 mPas, measured using a rotary viscometer (Brookfield CAP 2000, spindle 3, 2500 s$^{-1}$). The OH number works out at 150 mg KOH/g (resin solids). The molecular weight of the resin is Mn=2608 D and Mw=5990 D (determined by means of GPC/see below).

The solids content (solids) is measured as follows: on a metal lid with a diameter of about 6-8 cm, a sample of polyacrylate polyol in solid resin form is applied in an amount of 1 g to an analytical balance. Following addition of 1 ml of a suitable solvent (butyl acetate), the metal lid is dried in a forced air oven at 130° C. for 60 minutes. The residue which remains represents the solids content of the polyacrylate polyol in solid resin form. A duplicate determination is performed in each case.

The gel permeation chromatography (GPC) is carried out at 40° C. using a high-pressure liquid chromatography pump and a refractive index detector. The eluent used is tetrahydrofuran, with an elution rate of 1 ml/min. Calibration is performed using a poly-MMA standard. The number-average molecular weight Mn, the weight-average molecular weight Mw, and Mp are determined, with the polymolecularity index Mp being calculated from Mp=Mw/Mn.

2. Curing Agent Solution, Corresponding to Component B

A mixture of 95 parts of HMDI trimer (NCO content 23.5±0.5%) with 5 parts of an IPDI trimer (NCO content 11.9±0.4%) is diluted to a solids content of 85% in a 1:1 mixture of butyl acetate and xylene.

3. Diluent

1:1 mixture of xylene/butyl acetate (solvent)

4. Catalyst (Component C)

The metal contents reported in Table 2 (see section 7) are achieved by individual addition to component A of i) a Bi octoate solution in octanoic acid (2-ethylhexanoic acid) with a metal content of 25% Bi, ii) an Li octoate solution in octanoic acid (2-ethylhexanoic acid) with a metal content of 2% Li.

5. Coating Material Formula

TABLE 1

|  |  | C1 | I1 | I2 | C2 | I3 | I4 | C3 |
|---|---|---|---|---|---|---|---|---|
| 1 | Component A | 85.1 | 85.1 | 85.1 | 85.1 | 85.1 | 85.1 | 85.1 |
| 2 | Ethyl ethoxypropionate | 8.75 | 8.75 | 8.75 | 8.75 | 8.75 | 8.75 | 8.75 |
| 3 | Tinuvin ® 292 BASF SE | 0.9 | 0.9 | 0.9 | 0.9 | 0.9 | 0.9 | 0.9 |
| 4 | Hydroxyphenylalkylbenzotriazole | 1.3 | 1.3 | 1.3 | 1.3 | 1.3 | 1.3 | 1.3 |
| 5 | Bi octoate 25% Bi | 0.251 | 0.251 | 0.251 | 0.418 | 0.418 | 0.418 | 0.418 |
| 7 | Lithium octoate 2% Li | 0.693 | 0.788 | 1.05 | 1.155 | 1.312 | 1.75 | 0 |
| 9 | Component B | 32 | 32 | 32 | 32 | 32 | 32 | 32 |
| 10 | Diluent | 32 | 32 | 32 | 32 | 32 | 32 | 32 |

The concentration figures are absolute amounts (expressed in parts) based on the overall coating material formulation.

Production of the Coating Materials

For the production of the coating materials, items 1-4 are weighed out together and mixed homogeneously. The catalyst solutions are added individually directly before the start of experimentation, and are each mixed homogeneously with stirring. Component B and diluent are then likewise added and stirred in homogeneously. The coating film is then produced within not more than 30 minutes after the mixing of the components (see section 7). Ethyl ethoxypropionate is a solvent; Tinuvin® 292 and hydroxyphenylalkylbenzotriazole are light stabilizers.

6. Print Test (Determination of Curing Time)

The coating film is drawn down using a 100 μm doctor blade onto a glass plate. After drying at 60° C. for 18 minutes, the glass plate is placed on a commercial laboratory balance within 10 minutes following removal from the oven. Under thumb pressure, the film is then loaded for 20 s with a 2 kg weight. This test is repeated every 20 minutes. For a coating film which is obviously still soft or tacky, a waiting period is first observed until the coating film has reached sufficient freedom from tack and sufficient hardness. The overall experimentation time is about 6 hours. If marking is still apparent after this time, it is rated as ">360 min".

The experiments are evaluated after a storage time of 24 hours. For this evaluation, the surface of the coating is washed with an aqueous surfactant solution (commercial washing-up liquid) and with a soft cloth, in order to eliminate grease marks. Measurement always takes place against a standard. The coating is considered satisfactory if there is no thumb print visible on the coating film. The results of the experiments are shown in Table 2. This test is a measure of the assembly strength of refinishes; that is, the earlier the coating film attains its assembly strength following forced drying, the earlier that assembly work (or disassembly work for masking) can be commenced on the refinished bodywork.

7. Results

TABLE 2

Use of catalysts comprising lithium and bismuth as metal components; I1 to I4 are inventive and C1 to C3 are comparative examples.

|  | C1 | I1 | I2 | C2 | I3 | I4 | C3 |
|---|---|---|---|---|---|---|---|
| Bi [mmol] | 0.3 | 0.3 | 0.3 | 0.5 | 0.5 | 0.5 | 0.5 |
| Li [mmol] | 1.98 | 2.25 | 3.0 | 3.3 | 3.75 | 5.0 | 0 |
| Ratio Bi/Li (molar) | 1/6.6 | 1/7.5 | 1/10 | 1/6.6 | 1/7.5 | 1/10 | — |
| Print test 18' 60° C. (min) | >360 | 240 | 220 | 320 | 280 | 260 | >360 |

The examples according to Table 2 show that the coating materials of the invention with a catalyst, in which the molar ratio of lithium to bismuth is at least 7:1 [mol/mol], exhibit much shorter cure times than coating material systems using catalysts which do not have this ratio.

What is claimed is:

1. A coating material system, comprising:
   (A) a polyhydroxy group-containing compound selected from the group consisting of polyacrylate polyols and polymethacrylate polyols;
   (B) a polyisocyanate-containing compound,
   (C) a catalyst comprising lithium and bismuth with a molar ratio of the lithium to the bismuth of at least 7:1 [mol/mol], and
   (J) one or more solvents,
   wherein:
   i) components (A), (B), and (C) are present separately from one another, or
   ii) are mixed wholly or at least partly with one another, and
   wherein the coating material system is not aqueous, and the fraction of solvent (J) is in the range of from 20 to 80 wt % based on the total amount of the coating material system.

2. The system of claim 1, wherein the catalyst (C) has a molar ratio of lithium to bismuth in a range of from 7.5:1 to 12:1 [mol/mol].

3. The system of claim 2, wherein the catalyst (C) has a molar ration of lithium to bismuth of 8:1 to 10:1 [mol/mol].

4. The system of claim 2, wherein the catalyst (C) further comprises zinc.

5. The system of claim 1, wherein the polyisocyanate-containing compound (B) comprises 1,6-hexamethylene diisocyanate, isophorone diisocyanate, 4,4'-methylene dicyclohexyl diisocyanate, a biuret dimer thereof, an iminooxadiazinedione thereof, and/or an asymmetrical trimer thereof.

6. The system of claim 1, wherein the acid number of the polyhydroxy group-containing compound (A) is not more than 9 mg KOH/g.

7. The system of claim 6, wherein the acid number of the polyhydroxy group-containing compound (A) is not more than 7 mg KOH/g.

8. The system of claim 6, wherein the acid number of the polyhydroxy group-containing compound (A) is 0.5 to 5 mg KOH/g.

9. The system of claim 1, further comprising:
   a hydroxyl group-containing compound (D);
   an aminoplast resins or tris(alkoxycarbonylamino)triazine (E);
   a coating additive (F);
   a pigment (H); and/or
   a further filler (I);
   wherein
   i) the individual components (D) to (J) are present separately from one another; or
   ii) are mixed wholly or at least partly with one another or with components (A) to (C).

10. The system of claim 9, further comprising:
    a hydroxyl group-containing compound (D);
    a coating additive (F); and/or
    a pigment (H).

11. The system of claim 1, wherein:
    i) the coating material system is not aqueous, or
    ii) components (A) or (B) each form a mixture with the at least one solvent (J), but components (A) and (B) are present separately from one another, or
    iii) the catalyst (C) is present at least partly in at least one of the components (A) or (B) present separately from one another.

12. The system of claim 11, wherein the catalyst (C) is present at least partly in component (A).

13. The system of claim 1, wherein the catalyst (C) is present in the form of a salt.

14. The system of claim 13, wherein the catalyst (C) is present as a salt comprising:
    the lithium or bismuth; and
    a $C_6$-$C_{18}$ carboxylate.

15. The system of claim 13, wherein the catalyst (C) is present as Bi octanoate, Li octanoate, lithium neodecanoate, bismuth neodecanoate, lithium neononanoate, or bismuch nenonanoate.

16. The system of claim 1, in the form of a mixture of components (A), (B), and (C).

17. The system of claim 1, wherein the catalyst (C) has a molar ratio of the lithium to the bismuth of 7.5:1 to 12:1 [mol/mol],
    wherein the catalyst (C) further comprises zinc, and
    wherein the molar ratio of the lithium to the zinc is at least 6:1.

18. The system of claim 1, wherein the catalyst (C) comprises a further metal component.

19. A method for producing the system of claim 16, the method comprising:
    mixing components (A), (B), and (C), each from an initially separate form, to obtain a mixture.

20. The method of claim 19, wherein the mixing occurs at room temperature, with components (A) and (C) being mixed with one another beforehand or component (B) being added to component (A) or to a mixture comprising component (A).

21. A method for producing a polyurethane, the method comprising:
    at least partially curing the system of claim 16.

22. The method of claim 21, wherein the polyurethane forms at least part of a layer or coating.

23. The method of claim 22, wherein the layer or coating is a coating-material film.

24. The method of claim 21, wherein the polyurethane comprises a pigment (H) or further comprising applying the polyurethane in layer form to a basecoat film which optionally comprises a pigment (H), or to an optionally precoated substrate.

25. The method of claim 21, wherein the curing of the polyurethane takes place at temperatures in a range of from 20 to 80° C., the optional basecoat film having optionally been dried beforehand at temperatures in a range of from 20 to 80° C.

26. The method of claim 21, wherein the curing of the polyurethane occurs at a temperature in a range of from 20 to 60° C.

27. A coating material, comprising:
the system of claim 1,
wherein the coating material is adapted to function as a coating material in automotive finishing, for the repair of finishes, for automotive refinishing or for the coating of parts for installation in or on automobiles, of plastic substrates, or of commercial vehicles.

28. A method for producing a coating, the method comprising:
applying at least one coating of the system of claim 1 to an optionally precoated substrate or to a basecoat film.

29. The method of claim 28, wherein the coating comprises a polyurethane which is obtained by at least partial curing of the coating material system.

30. The method of claim 29, wherein the coating comprises a polyurethane which is obtained by complete curing of the coating material system.

31. A method, comprising:
catalyzing a urethane reaction by contacting the system of claim 1 with a catalyst comprising lithium and bismuth, wherein:
a molar ratio of lithium to bismuth is at least 7:1 [mol/mol], and
the urethane reaction produces a polyurethane suitable for producing paint, for repairing a paint finish, for automotive refinishing, or for coating an automobile part, plastic substrate, or commercial vehicle.

32. A method for producing a polyurethane, comprising complete curing of the system of claim 16.

33. A coating material formed by the method of claim 21, wherein the coating material is a clearcoat or a pigmented paint.

* * * * *